(12) United States Patent
Hauzi et al.

(10) Patent No.: US 12,321,681 B2
(45) Date of Patent: Jun. 3, 2025

(54) FULL DIE AND PARTIAL DIE TAPE OUTS FROM COMMON DESIGN

(71) Applicant: Apple Inc., Cupertrino, CA (US)

(72) Inventors: Haim Hauzi, Ramat Gan (IL); Eran Tamari, Herzeliya Pituach (IL); Per H. Hammarlund, Sunnyvale, CA (US); Jonathan M. Redshaw, St Albans (GB); Alfredo Kostianovsky, Tel Aviv (IL); Idan Nissel, Petach-Tiqva (IL); Leonid Gitelman, Yokneam (IL); Oren Betzalel, Herzliya (IL); Dalia R. Haim, Haifa (IL); Lior Zimet, Kerem Maharal (IL)

(73) Assignee: Apple Inc., Cupertino, CA (US)

( * ) Notice: Subject to any disclaimer, the term of this patent is extended or adjusted under 35 U.S.C. 154(b) by 400 days.

(21) Appl. No.: 17/873,694

(22) Filed: Jul. 26, 2022

(65) Prior Publication Data
US 2023/0053664 A1 Feb. 23, 2023

Related U.S. Application Data

(60) Provisional application No. 63/236,013, filed on Aug. 23, 2021.

(51) Int. Cl.
*G06F 30/398* (2020.01)
*G03F 1/70* (2012.01)
*G06F 30/392* (2020.01)

(52) U.S. Cl.
CPC ............ *G06F 30/398* (2020.01); *G03F 1/70* (2013.01); *G06F 30/392* (2020.01)

(58) Field of Classification Search
CPC ............ G06F 12/0811; G06F 12/0813; G06F 12/0815; G06F 12/0824; G06F 12/0831;
(Continued)

(56) References Cited

U.S. PATENT DOCUMENTS 7,514,794 B2 4/2009 Naruse et al.
8,207,617 B2 6/2012 Youn et al.
(Continued)

FOREIGN PATENT DOCUMENTS

CN 113361227 A 9/2021
DE 1 241 880 A 6/1967
(Continued)

OTHER PUBLICATIONS

Office Action in Taiwanese Appl. No. 111131608 mailed Aug. 9, 2023, 5 pages.
(Continued)

*Primary Examiner* — Binh C Tat
(74) *Attorney, Agent, or Firm* — Kowert, Hood, Munyon, Rankin & Goetzel, P.C.

(57) ABSTRACT

A chip design methodology and a set of integrated circuits that are taped out from a common design database are disclosed. The area of a full instance of the integrated circuit is defined, and one or more chop lines are defined to identify portions that will be removed for one or more partial instances. A variety of techniques and mechanisms are defined to permit the tape outs to occur from a common design database, so that the effort to tape out partial instances may be minimized beyond that to tape out the full instance.

20 Claims, 11 Drawing Sheets

(58) Field of Classification Search
CPC .. G06F 12/0833; G06F 12/109; G06F 12/128; G06F 13/161; G06F 13/1668; G06F 13/28; G06F 13/4068; G06F 15/17368; G06F 15/7807; G06F 2212/1024; G06F 2212/1048; G06F 2212/305; G06F 2212/455; G06F 2212/657; G06F 2111/16; G06F 2115/02; G06F 2119/20; G06F 30/392; G06F 30/398; H01L 23/5227; H01L 27/0207; H01L 2224/73267; H01L 2224/49176; H01L 24/48; H01L 24/49; H01L 2924/00; H01L 2224/32225; H01L 23/5386; H01L 2924/19105; G03F 1/70
USPC .................................................. 716/108–115
See application file for complete search history.

(56) References Cited

U.S. PATENT DOCUMENTS

| | | | |
|---|---|---|---|
| 8,671,381 | B1 | 3/2014 | Wang et al. |
| 9,564,432 | B2 | 2/2017 | Or-Bach et al. |
| 10,268,122 | B2 | 4/2019 | Bon-Ghazale et al. |
| 10,713,406 | B2 | 7/2020 | Kahng et al. |
| 2003/0088841 | A1 | 5/2003 | Teig et al. |
| 2003/0214344 | A1 | 11/2003 | Suwa et al. |
| 2015/0187608 | A1* | 7/2015 | Ganesan ............ H01L 23/49811 438/118 |
| 2015/0340305 | A1* | 11/2015 | Lo .................... H01L 23/49541 438/123 |
| 2015/0379182 | A1 | 12/2015 | Huynh et al. |
| 2016/0367984 | A1* | 12/2016 | Delamarche ...... B01L 3/502707 |
| 2018/0089340 | A1 | 3/2018 | Sendig et al. |
| 2021/0242125 | A1 | 8/2021 | Do |

FOREIGN PATENT DOCUMENTS

| | | |
|---|---|---|
| DE | 602 26 240 T2 | 5/2009 |
| JP | H04109661 A | 4/1992 |
| JP | H1079437 A | 3/1998 |
| TW | 201011585 A | 3/2017 |
| TW | 201727519 A | 8/2017 |

OTHER PUBLICATIONS

Office Action in German Appl. No. 10 2022 121 035.9 mailed Aug. 30, 2023, 13 pages.
Office Action and Search Report in GB Appl. No. 2211197.5 mailed Nov. 28, 2023, 11 pages.
Office Action in Japanese Appl. No. 2022-128947 mailed Oct. 13, 2023, 6 pages.
Decision to Grant in Japanese Appl. No. 2022-128947 mailed Mar. 22, 2024, 2 pages.
Examination Report in UK Patent Application No. 2211197.5 mailed Dec. 20, 2022, 6 pages.
Combined Search and Examination Report in UK Patent Application No. 2404319.2 mailed Sep. 5, 2024, 4 pages.

* cited by examiner

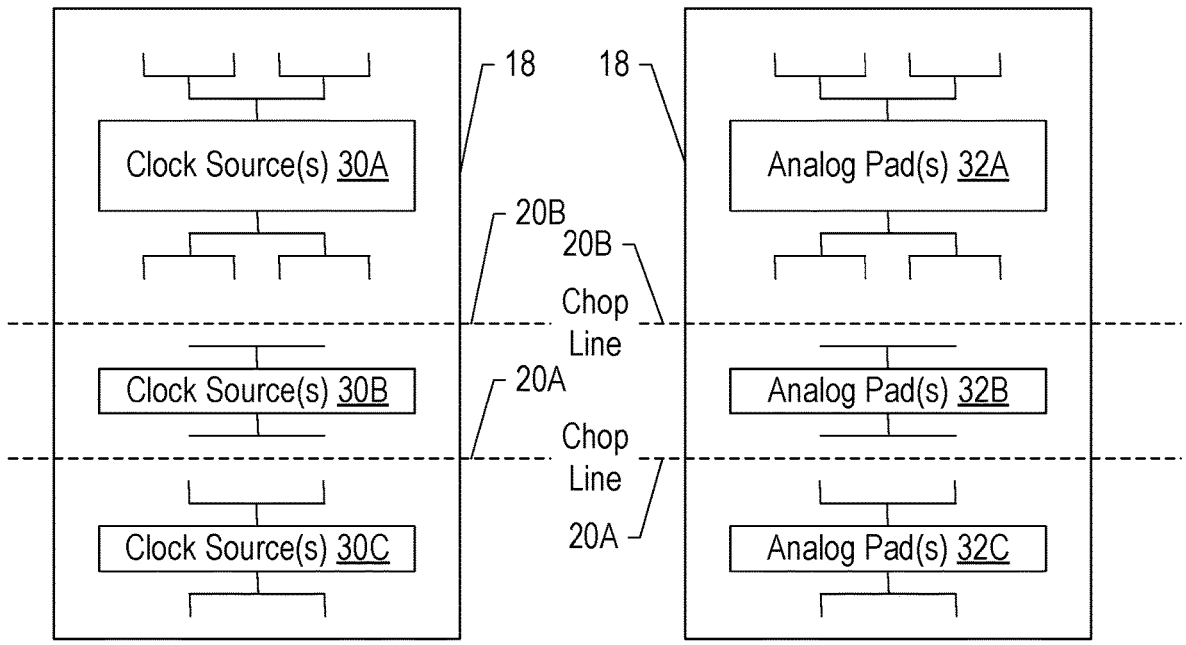
FIG. 5    FIG. 6
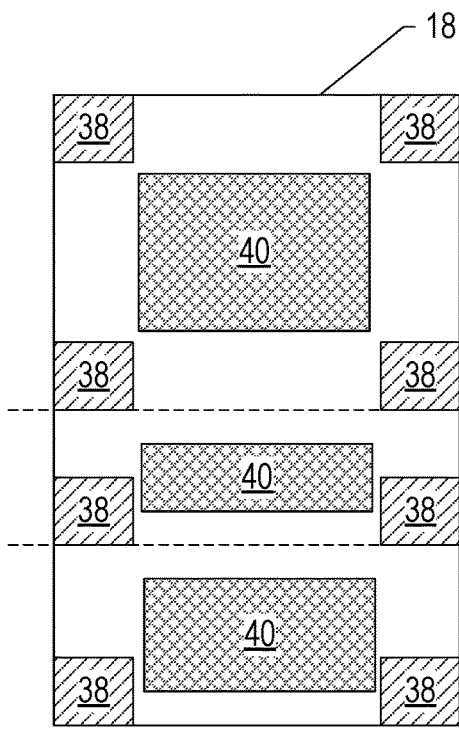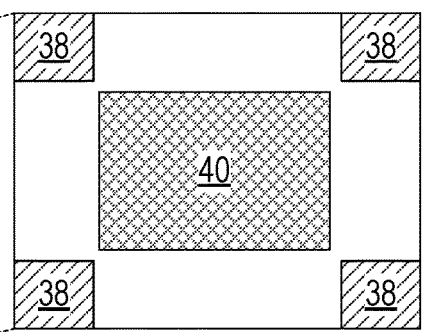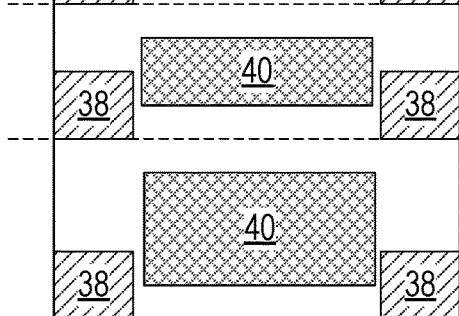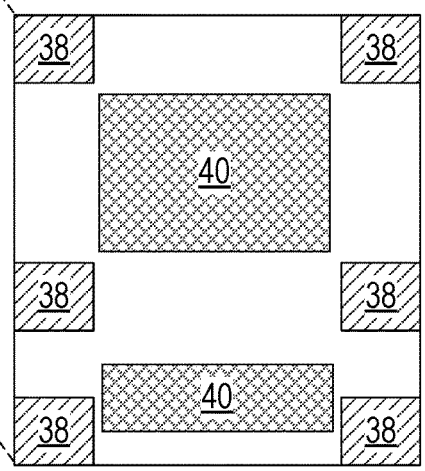
FIG. 7

FULL DIE AND PARTIAL DIE TAPE OUTS FROM COMMON DESIGN

This application claims benefit of priority to U.S. Provisional Patent Application Ser. No. 63/236,013, filed on Aug. 23, 2021. The above application is incorporated herein by reference in its entirety. To the extent that any incorporated material conflicts with material expressly set forth therein, the expressly set forth material controls.

BACKGROUND

Technical Field

Embodiments described herein are related to integrated circuits and, more particularly, to an integrated circuit that is designed for full and partial tape outs.

Description of the Related Art

Integrated circuits include a variety of digital logic circuits and/or analog circuits that are integrated onto a single semiconductor substrate or "chip." A wide variety of integrated circuits exist, from fixed-function hardware to microprocessors to systems on a chip (SOCs) that include processors, integrated memory controllers, and a variety of other components that form a highly integrated chip that can be the center of a system.

A given integrated circuit can be designed for use in a variety of systems (e.g., an "off the shelf" component). The given integrated circuit can include a set of components that allow it to be used in the various systems, but a particular system may not require all of the components or the full functionality and/or performance of all of the components. The extra components/functionality are effectively wasted, a sunk cost and a consumer of power (at the least, leakage power) in the system. For portable systems that at least sometimes operate on a limited power supply (e.g., a battery), as opposed to the essentially unlimited supply of a wall outlet, the inefficient use of power leads to inefficient use of the limited supply and even unacceptably short times between charging requirements for the limited supply.

Matching integrated circuit functionality to the requirements of a given system is therefore important to producing a high-quality product. However, custom integrated circuit design for many different systems also represents a cost in terms of design and validation effort for each integrated circuit.

BRIEF DESCRIPTION OF THE DRAWINGS

The following detailed description refers to the accompanying drawings, which are now briefly described.

FIG. 5 is a block diagram of one embodiment of the integrated circuit shown in FIG. 1 with local clock sources in each sub area of the integrated circuit.

FIG. 6 is a block diagram of one embodiment of the integrated circuit shown in FIG. 1 with local analog pads in each sub area of the integrated circuit.

FIG. 7 is a block diagram of one embodiment of the integrated circuit shown in FIG. 1 with block out areas at the corners of each subarea and areas for interconnect "bumps" that exclude areas near the edges of each subarea.

Figure 1:
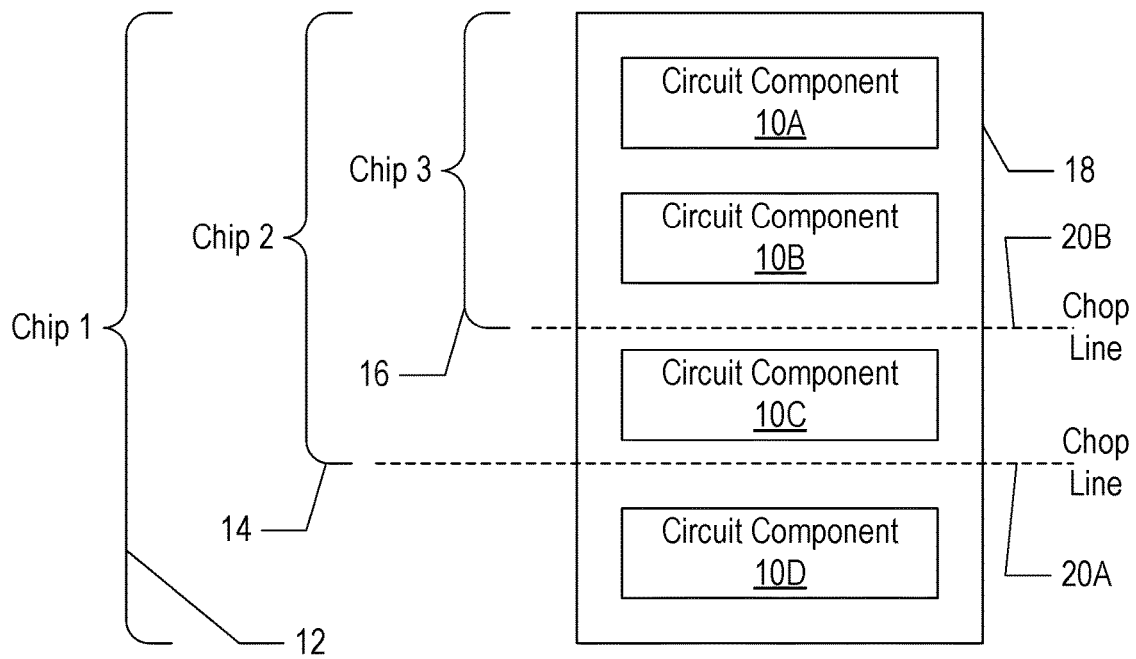
FIG. 1 is a block diagram of one embodiment of an integrated circuit design that supports full and partial instances.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

In an embodiment, a methodology and design of an integrated circuit supports more than one tape out, and ultimately manufacture, of different implementations of the integrated circuit based on a common design database. The design may support a full instance in which all circuit components included in the design are included in the manufactured chip, as well as one or more partial instances that include a subset of the circuit components in the manufactured chip. The partial instances may be manufactured on smaller die, but the circuit components and their physical arrangement and wiring with the partial instance may be the same as the corresponding area within the full instance. That is, the partial instance may be created by removing a portion of the area of the full instance, and the components thereon, from the design database to produce the partial instance. The work of designing, verifying, synthesizing, performing timing analysis, performing design rules checking, performing electrical analysis, etc. may be shared across the full instance and the partial instances. Additionally, an integrated circuit chip that is appropriate for a variety of products with varying compute requirements, form factors, cost structures, power supply limitations, etc. may be supported out of the same design process, in an embodiment. In an embodiment, the full instance of the SOC may be coupled with other full instances or even different SOCs to build a larger system. In an embodiment, a partial instance may similarly be coupled with a full instance, other partial instances, and/or other SOCs to build a larger system as well. In an embodiment, a partial instance of a given SOC may include a partial instance of a given circuit component.

For example, the full instance may include a certain number of compute units (e.g., central processing unit (CPU) processors, graphics processing units (GPUs), coprocessors attached to the CPU processors, other specialty processors such as digital signal processors, image signal processors, etc.). Partial instances may include fewer compute units. The full instance may include a certain amount of memory capacity via a plurality of memory controllers, and the partial instances may include fewer memory controllers supporting a lower memory capacity. In an embodiment, the number of memory channels may be reduced, which may reduce bandwidth. That is, the reduction in memory controllers/memory channels may support a lower memory and/or a lower memory bandwidth. The full instance may include a certain number of input output (I/O) devices and/or interfaces (also referred to as peripheral devices/interfaces or simply peripherals). The partial instance may have fewer I/O devices/interfaces.

In an embodiment, the partial instances may further include a stub area. The stub area may provide terminations for input signals to the circuit components included in the partial instances, where the sources for those input signals in the full instance are circuit components in the removed area and thus the input signals are not connected in the absence of the stub. Output signals from the circuit components to circuit components in the removed area may at least reach the edge of the stub and may be unconnected. In an embodiment, the stub area may include metallization to connect the input signals to power (digital one) or ground (digital zero) wires (e.g., power and ground grids) as needed to provide proper function of the circuit components in the partial instance. For example, a power manager block in the partial instance may receive inputs from the removed circuit components, and the inputs may be tied to power or ground to indicate that the removed circuit components are powered off, idle, etc. so that the power manager block does not wait on the removed circuit component's response when changing power states, etc. In an embodiment, the stub area may include only metallization (wiring). That is, the stub area may exclude active circuitry (e.g., transistors formed in the semiconductor substrate). The metallization layers (or metal layers) are formed above the surface area of the semiconductor substrate to provide the wire interconnect between active circuit elements (or to provide the digital one/zero values in the stub area). Managing the partial instance designs in this manner may minimize the amount of verification of the partial instances over the effort in the full instance. For example, additional timing verification may not be needed, additional physical design verification may be minimal, etc.

FIG. 1 is a block diagram illustrating one embodiment of a full instance and several partial instances of an integrated circuit. The full instance of the integrated circuit is indicated by curly brace 12 ("chip 1") and partial instances of the integrated circuit are indicated by curly braces 14 and 16 ("chip 2" and "chip 3"). The full instance, chip 1, includes a plurality of circuit components 10A-10D. The physical locations of the circuit components 10A-10D on a surface of a semiconductor substrate chip or die (reference numeral 18) for the full instance is indicated by the placement of the circuit components 10A-10D. FIG. 1 is a simplified representation and there may be more circuit components and the physical arrangement may be more varied then that shown in FIG. 1. Various interconnect between the circuit components 10A-10D is used for inter-component communication, not shown in FIG. 1. The interconnect, as well as interconnect within the circuit components 10A-10D themselves, may be implemented in metallization layers above the semiconductor substrate surface.

Each partial instance corresponds to a "chop line" 20A-20B in FIG. 1. The chop line divides those circuit components 10A-10D that are included in the full instance from circuit components 10A-10D that are included in the various partial instances. Thus, for example, chip 2 is defined by the chop line 20A and includes circuit components 10A-10C but not circuit component 10D. Similarly, chip 3 is defined by the chop line 20B and includes circuit components 10A-10B but not circuit components 10C-10D. The chop lines may be defined in the design database, or may be part of the design process but may not be represented explicitly in the design database.

Generally, the design database may comprise a plurality of computer files storing descriptions of the circuit components 10A-10D and their interconnection. The design database may include, for example, register-transfer level (RTL) descriptions of the circuits expressed in hardware description language (HDL) such as Verilog, VHDL, etc. The design database may include circuit descriptions from a circuit editor tool, for circuits that are implemented directly rather than synthesized from the RTL descriptions using a library of standard cells. The design database may include netlists resulting from the synthesis, describing the standard cell instances and their interconnect. The design database may include physical layout descriptions of the circuit components and their interconnect, and may include the tape out description files with describe the integrated circuits in terms of geometric shapes and layers that can be used to create masks for the integrated circuit fabrication process. The tape out description files may be expressed in graphic design system (GDSII) format, open artwork system interchange standard (OASIS) format, etc. Any combination of the above may be included in the design database.

The chop lines 20A-20B divide the chip 18 area into subareas within which subsets of the circuit components 10A-10D are instantiated. For example, the chop line 20B divides the chip 18 area into a first subarea (above the line 20B in as oriented in FIG. 1) and a second subarea (below the line 20B). The chop line 20A further divides the second subarea into third and fourth subareas, where the third subarea is adjacent to, or abuts, the first subarea. The combination of the first subarea and the second subarea represents the full instance. The first subarea alone (along with a stub area) represents the smallest partial instance (chip 3). The first subarea and the third subarea represent the other partial instance in this example (chip 2).

The physical locations of circuit components within a given subarea, and interconnect within the circuit components and between the circuit components, may not change between the full instance and the partial instances. Thus, when the circuit components within the full instance meet timing requirements, physical design requirements, and electrical requirements for successful manufacture and use of the full instance, then the same requirements should also be met by the partial instances for the most part. Physical design and electrical requirements within the stub areas may need to be verified, and certain physical design requirements may be applied to the subareas such as corner exclusions, controlled collapse chip connect (C4) bump exclusion zones, etc. as discussed below. However, once the full instance is verified and ready for tape out, the tape out of the partial instances may proceed with minimal efforts, in an embodiment.

Figure 2:
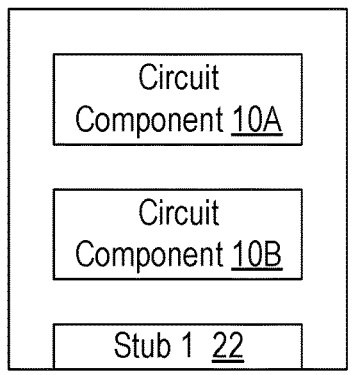
FIGS. 2-4 are various embodiments of full and partial instances of the integrated circuit shown in FIG. 1.
Figure 3:
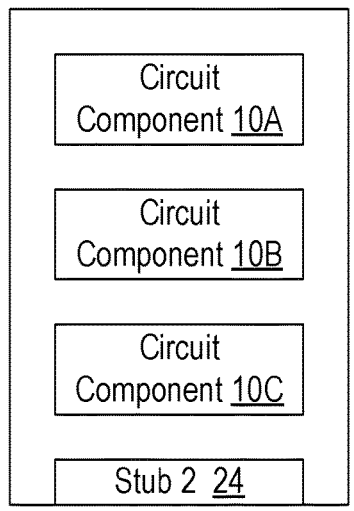
Figure 4:
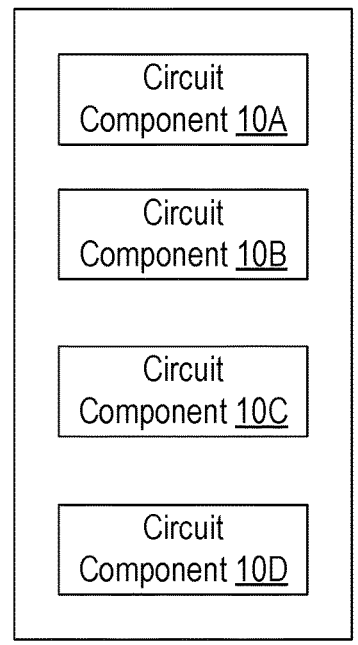

FIGS. 2-4 illustrate the partial instances and the full instance for the embodiment shown in FIG. 1. FIG. 4 is the full instance, and thus includes the circuit components 10A-10D. FIGS. 2 and 3 correspond to chip 3 and chip 2, respectively. Thus, the partial instance in FIG. 2 includes the circuit components 10A-10B from the first subarea, as well as a stub area 22 (stub 1). The partial instance in FIG. 3 includes the circuit components 10A-10B from the first subarea, the circuit component 10C from the second subarea, and a stub area 24 (stub 2). In another embodiment, a partial instance may be formed by removing the portion between the chop lines 20A-20B, e.g., the component circuit 10C, and joining the remaining subareas, e.g., component circuits 10A-10B and component circuit 10D. If more than two chop lines are defined, then even more variations may be supported by removing one or more subareas between respective chop lines. Such an embodiment may by implementing a stub area between the chop lines (which may be smaller than the removed subarea), or by ensuring the wires on either side of the removed subarea match up and connect correctly when the subarea is removed and the remaining subareas are moved together. In still another embodiment, where multiple chop lines are used, one or more chop lines may be orthogonal to other chop lines, allowing sub areas to be removed in more than one direction. Any combination of orthogonal chop lines and middle section removal/joining of outer sections may be implemented in various embodiments.

A circuit component may be any group of circuits that are arranged to implement a particular component of the IC (e.g., a processor such as a CPU or GPU, a cluster of processors or GPUs, a memory controller, a communication fabric or portion thereof, a peripheral device or peripheral interface circuit, etc.). A given circuit component may have a hierarchical structure. For example, a processor cluster circuit component may have multiple instances of a processor, which may be copies of the same processor design placed multiple times within the area occupied by the cluster.

In accordance with this description, a method may comprise defining, in a design database corresponding to an integrated circuit design, an area to be occupied by the integrated circuit design when fabricated on a semiconductor substrate. For example, the area may be the area of the full instance as shown in FIGS. 1 and 4. The method may further comprise defining a chop line (which may be one of multiple chop lines). The chop line may demarcate the area into a first subarea and a second subarea, wherein a combination of the first subarea and the second subarea represents the full instance. The first subarea and a stub area represent a partial instance of the integrated circuit that includes fewer circuit components than the full instance. In the design database, a physical location of a plurality of circuit components included in both the full instance and the partial instance of the integrated circuit are defined in the first subarea. Relative location of the plurality of circuit components within the first subarea and the interconnect of the plurality of circuit components within the first subarea may be unchanged in the full instance and the partial instance. A physical location of another plurality of circuit components included in the full instance but excluded from the partial instance is defined in the second subarea. A stub area is also defined in the design database. The stub area may include terminations for wires that would otherwise traverse the chop line between the first and second subareas. The stub area may ensure correct operation of the plurality of circuit components in the first subarea in the absence of the second subarea in the partial instance. A first data set for the full instance may be produced using the first subarea and the second subarea, the first data set defining the full instance for manufacturing of the full instance. A second data set for the partial instance may also be produced using the first subarea and the stub area. The second data set defines the partial instance for manufacture of the partial instance. In an embodiment, the method may further comprise defining a second chop line in the second subarea, dividing the second subarea into a third subarea and a fourth subarea. The third subarea may be adjacent to the first subarea, and the third subarea and the first subarea may represent a second partial instance of the integrated circuit. The method may further include producing a third data set for the second partial instance using the first subarea, the third subarea, and a second stub area. The third data set defines the second partial instance for manufacture of the second partial instance.

As mentioned above, the stub area may exclude circuitry. For example, the stub area may exclude active circuitry such as transistors or other circuits formed in the semiconductor substrate. The stub area may exclude circuits that may be formed in the metallization layers as well (e.g., explicit resistors, inductors, or capacitors). While the metallization layers have parasitic properties (e.g., resistance, inductance, and capacitance), explicitly-defined circuits may not be permitted. The stub area may include only wiring in one or more metallization layers above a surface area of the semiconductor substrate.

Another method may include receiving the first data set and the second data set, e.g., at a semiconductor manufacturing facility or "foundry." The method may further include manufacturing a first plurality of the full instance of the integrated circuit based on the first data set and manufacturing a second plurality of the partial instance of the integrated circuit based on the second data set.

An integrated circuit implementing a partial instance in accordance with this disclosure may comprise a plurality of circuit components physically arranged on a surface of a semiconductor substrate forming the integrated circuit; and a plurality of wire terminations along a single edge of the surface (e.g., the stub area). The plurality of wire terminations may be electrically connected to a plurality of supply wires of the integrated circuit to provide fixed digital logic levels on wires that are inputs to one or more of the plurality of circuit components. The power supply wires may be part of a power supply grid (e.g., power and/or ground) in the metallization layers of the integrated circuit. The power and ground grids may also be referred to as power and ground grids. The input wires that are terminated by the wire terminations are oriented to intersect the single edge and lack a circuit configured to drive the wires within the integrated circuit (e.g., the wires are driven in the full instance by the circuit components in the second subarea that are not present in the partial instance). The area along the single edge that includes the plurality of wire terminations also excludes active circuit elements. For example, the area along the single edge may include only wiring in one or more metallization layers above a surface area of the semiconductor substrate.

The methodology described herein may affect a variety of areas of the overall design process for an integrated circuit. For example, floor planning is an element of the design process in which the various circuit components are allocated to areas on the semiconductor substate. During floor planning, the existence of the partial instances and the location of the chop lines may be considered, ensuring that circuit components that are included in all instances are in the first subarea and other circuit components are included in the second subarea (or third and fourth subareas, etc.). Additionally, the shape of the subareas may be carefully designed to provide efficient use of area in both the full instance and the partial instances. Main busses or other interconnect that may provide communication between circuit components throughout the full instance may be designed to correctly manage communication in the various instances (e.g., in a partial instance, the busses may be terminated in the stub area or may be unconnected in the stub area, and thus communications should not be transmitted in the direction of the stub area). The floor plan may also consider the requirements for tape out for both the full instance and the partial instances (e.g., various exclusion zones as discussed in further detail below). Additionally, the floor plan may attempt to minimize the number of wires that traverse the chop line to simplify the verification that the partial instances will operate correctly.

A consideration, in an embodiment, at the floor planning stage may include the definition of certain critical connections that could be impacted by the chopping to partial instances. Clock interconnect and analog interconnect may be examples. The clock interconnect (or "clock tree") is often designed so that the distance and electrical load from the clock generator, or clock source, to the clock terminations at various state elements in the circuit components is approximately the same, or "balanced". The state elements may include, e.g., flipflops ("flops"), registers, latches, memory arrays, and other clocked storage devices.

In order to maintain the balance among the various instances of the integrated circuit design, independent clock trees may be defined between local clock sources in each subarea and the state elements within that subarea. For example, FIG. 5 is a block diagram illustrating an embodiment of the full instance of the integrated circuit (chip 18) and the chop lines 20A-20B demarcating the subareas of the full instance for chopping into the partial instances. Local clock source(s) 30A-30C are illustrated, each driving independent clock trees illustrated by the lines within each subarea. The clock trees may not cross the chop lines 20A-20B. That is, the clock tree within a given subarea may remain within that subarea.

A clock source may be any circuit that is configured to generate a clock signal to the circuitry coupled to its clock tree. For example, a clock source may be a phase lock loop (PLL), a delay lock loop (DLL), a clock divider circuit, etc. The clock source may be coupled to a clock input to the integrated circuit on which an external clock signal is provided, which the clock source may multiply up in frequency or divide down in frequency while locking phase or clock edges to the external signal.

Thus, a method may further comprise defining, in the first subarea, one or more first clock trees to distribute clocks within the first subarea and defining, in the second subarea, one or more second clock trees to distributed clocks with the second subarea. The one or more first clock trees may be electrically isolated from the one or more second clock trees in the full instance. The clock trees may be physically independent as shown in FIG. 5 (e.g., connected to different local clock sources). The clock trees may not cross a chop line into another subarea. In a method of manufacture, the first data set may further comprise one or more first clock trees to distribute clocks within the first subarea and one or more second clock trees to distribute clocks with the second subarea, and wherein the one or more first clock trees may be electrically isolated from the one or more second clock trees in the full instance.

In an embodiment, an integrated circuit may comprise one or first more clock trees to distribute clocks within a first subarea of the first area; and one or more second clock trees to distributed clocks with the second subarea. The one or more first clock trees may be electrically isolated from the one or more second clock trees.

FIG. 6 is a block diagram of one embodiment of the full die 18, demarcated by the chop lines 20A-20B, and the provision of local analog pads 32A-32C within each subarea defined by the chop lines 20A-20B. The analog pads 32A-32C may provide connection points for analog inputs to the chip. Analog signals often have special requirements, such as shielding from digital noise that can affect the accuracy and functionality of the analog signals, which are continuous value signals in contrast to digital signals that have meaning only at the digital values and not in transition therebetween. Ensuring that the analog requirements are met within each subarea may simplify the design of the integrated circuit overall. In an embodiment, if there is no usage of analog signals within a given subarea, that subarea may exclude analog pads and signal routing.

Thus, a method may further include defining, in the first subarea, one or more first analog inputs and defining, in the second subarea, one or more second analog inputs. The one or more first analog inputs may remain with the first subarea and the one or more second analog inputs may remain within the second subarea. That is, analog signals on the inputs or derived from the inputs may be transported on wires that do not cross the chop lines 20A-20B. In a method of manufacture, the first data set may further include one or more first analog inputs in the first subarea, wherein the one or more first analog inputs remain with the first subarea, and wherein the first data set further includes one or more second analog inputs in the second subarea, wherein the one or more second analog inputs remain within the second subarea.

In accordance with this disclosure, an integrated circuit may comprise a first plurality of circuit components physically arranged within a first area of a surface of a semiconductor substrate forming the integrated circuit and a second plurality of circuit components physically arranged within a second area of the surface of the semiconductor substrate forming the integrated circuit. One or more first analog inputs may be provided within the first area, wherein the one or more first analog inputs are isolated to the first plurality of circuit components. One or more second analog inputs within the second area, wherein the one or more second analog inputs are isolated to the second plurality of circuit components.

Another feature of integrated circuits that may be considered is the design for test (DFT) strategy. DFT generally includes a port or ports on which a DFT interface is defined, such as an interface compatible with the joint test access group (JTAG) specifications. DFT may include defining scan chains of state elements in the design so that the state can be scanned in and scanned out, and scan chains may be defined to remain within a given sub area, for example. Separate DFT ports may be provided within each subarea to minimize cross-chop line communication as much as possible. If cross-chop line communication is needed, such signals may be terminated (inputs to a subarea) and no-connected (outputs of a subarea) in the stub area, similar to other signals. In an embodiment, scan networks and other DFT networks may be designed as hierarchical rings, so that the portions in the removed circuit components may be disconnected from the DFT network without further impact on the remaining network.

In an embodiment, some circuit components may be instantiated multiple times within the full instance. One or more of the instances may be in the subareas that are not included in the one or more of the partial instances. These circuit components may be designed to meet all requirements (timing, physical, electrical) at each location of an instance, and thus may be over-designed for some other locations (e.g., the circuit component may be designed for worst case clock skew across its locations, etc.). Additionally, the partial instances may have a different packaging solution, which may require additional design to handle differences in the packages (e.g., different IR voltage drops).

In an embodiment, the foundry may require the fabrication of certain "non-logical" cells on the semiconductor substrate. These cells are not part of the integrated circuit itself, but may be used by the foundry to tune the manufacturing process. The foundry-required cells may have strict rules and may be die-size dependent, and thus planning for the placement of these cells in the floorplan of the full instance so that they are properly located in the partial instance(s) may be needed.

FIG. 7 illustrates an embodiment of another consideration for the integrated circuit design: exclusion areas (or exclusion zones) of various types. On the left side in FIG. 7 is the full instance (chip 1) of the full die 18, along with the partial instances on the right side, Chip 3 at the top (with its location in the full instance, above the chip line 20B, indicated by the dotted lines 34) and chip 2 at the bottom (with its location in the full instance, above the chop line 20A, indicated by the dot and dash lines 36). For each instance, the corners of the chips have exclusion zones in which circuitry is not permitted (or must follow much stricter design rules) than other parts of the semiconductor substrate surface. The corner exclusion zones may be defined because the mechanical stress on the corners of the semiconductor die may be greater than at other locations of the chip. The corner exclusion zones are indicated by cross hatched areas denoted by reference numeral 38 in FIG. 7.

Accordingly, the full instance has corner exclusive zones at each of its four corners, as well as "corner" exclusion zones along the sides of the chip, at the corners of the subareas adjacent to the chop lines 20A-20B which will end up being corners of the chips for the partial instances. The additional corner exclusion zones may be the same size as the corner exclusion zones of the full instance, or may be different sizes if the size of the corner exclusion zones scale with overall die size.

Thus, a method may further comprise defining a plurality of exclusion zones at respective corners of the semiconductor substrate, wherein circuit components are excluded from the plurality of exclusion zones according to mechanical requirements of a fabrication process to be employed to manufacture the integrated circuit. The method may further comprise defining additional exclusion zones at corners of the first subarea adjacent to the chop line, whereby the partial instance includes exclusion zones at respective corners of the semiconductor substrate with the partial instance formed thereon. The first data set in the method of manufacturing may include a plurality of exclusion zones at respective corners of the semiconductor substrate, wherein circuit components are excluded from the plurality of exclusion zones according to mechanical requirements of a fabrication process to be employed to manufacture the integrated circuit; and the first data set may include additional exclusion zones at corners of the first subarea adjacent to the second subarea, whereby the partial instance includes exclusion zones at respective corners of the semiconductor substrate with the partial instance formed thereon.

Additionally, an integrated circuit (e.g., including a full instance) may comprise a first plurality of circuit components physically arranged within a first area of a surface of a semiconductor substrate forming the integrated circuit; a plurality of exclusion zones at respective corners of the semiconductor substrate, wherein circuit components are excluded from the plurality of exclusion zones according to mechanical requirements of a fabrication process employed to manufacture the integrated circuit; and another plurality of exclusion zones separate from the respective corners along a pair of nominally parallel edges of the semiconductor substrate, wherein circuit components are excluded from the other plurality of exclusion zones, and wherein the other plurality of exclusion zones are dimensioned substantially the same as the plurality of exclusion zones.

FIG. 7 also illustrates the permissible locations of C4 bumps on the full instance and partial instances of the integrated circuit, shown as double cross hatched areas in FIG. 7, reference numeral 40. Areas outside of the areas indicated by the double cross hatched areas 40 may not be permissible locations for C4 bumps (e.g., exclusion zones for C4 bumps) or there may be more stringent rules for the placement of C4 bumps in those areas. The permissible locations/exclusion zones thus exist for each edge of each instance. That is, there may be C4 exclusion zones around the periphery of the full die 18, as well as on both sides of the chop lines 20A-20B. Accordingly, a method may further comprise defining a second exclusion zone along an edge of the first subarea that is adjacent to the second subarea, wherein controlled collapse chip connection (C4) connections are excluded from the second exclusion zone. In a method of manufacture, the first data set may further include a second exclusion zone along an edge of the first subarea that is adjacent to the second subarea, wherein controlled collapse chip connection (C4) connections are excluded from the second exclusion zone. In an embodiment, an integrated circuit may comprise a second exclusion zone along a line between the plurality of exclusion zones, wherein controlled collapse chip connection (C4) connections are excluded from the second exclusion zone.

Figure 8:
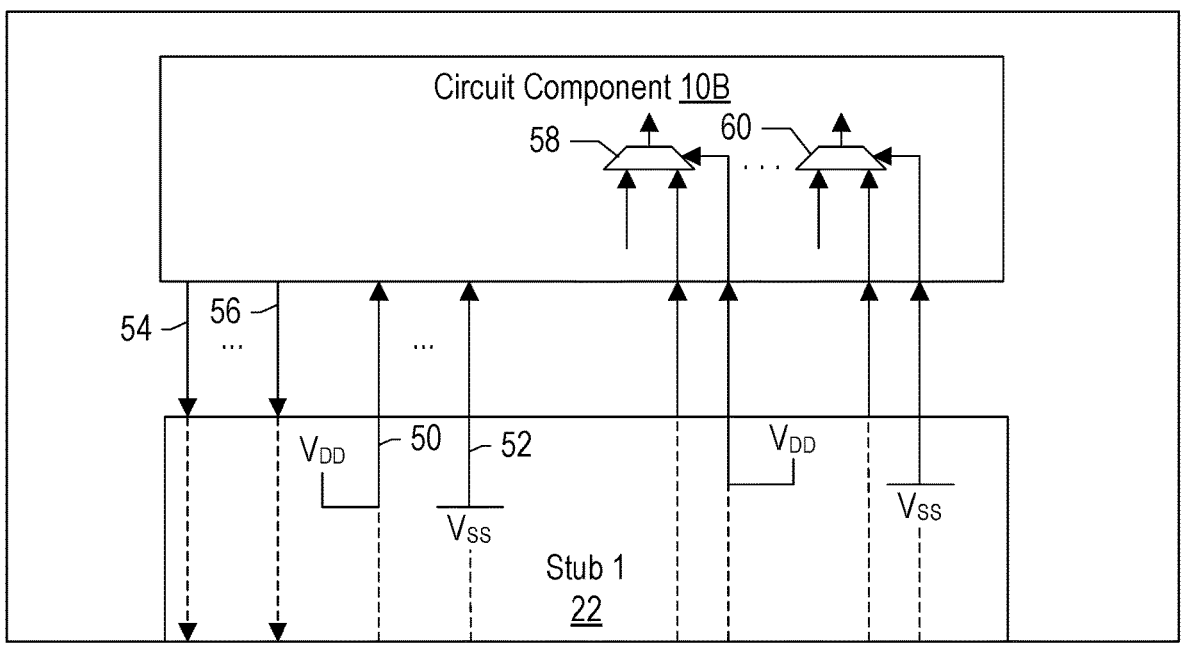
FIG. 8 is a block diagram illustrating one embodiment of a stub and a corresponding circuit component.

FIG. 8 is a block diagram illustrating one embodiment, in greater detail, of the circuit component 10B and the stub area 22 for the chip 3 embodiment shown in FIG. 2. Similar connections to the circuit component 10A may be provided as well, and the stub area 24 in FIG. 3 may be similar with the circuit components 10A-10C. The stub area 22 may include terminations such as $V_{DD}$ terminations 50 (for inputs to be tied up, or tied to a binary one) and $V_{SS}$, or ground, terminations 52 (for inputs to be tied down, or to a binary zero) for the circuit component 10B for inputs that would be provided by a removed circuit component that is part of the full instance but not part of a partial instance, illustrated by the dotted lines in FIG. 8 from the terminations to the edge of the stub area 22. The choice of binary one or binary zero for a given termination may depend on the logical effect of the input within the circuit component 10B. Generally, the termination may be selected as whichever value will cause the receiving circuit to proceed without further input from the removed circuit component that would source the input in the full instance (e.g., as an output of the removed circuit component). The termination provides a known value when there is a lack of a driving circuit for the signal. Outputs of the circuit component 10B that would be connected to a removed circuit component may reach the stub area 22 (e.g., reference numerals 54 and 56), but may be no-connects (e.g., not connected to a receiving circuit). In the full instance, or a larger partial instance, the output wires 54 and 56 may extend through to circuit components that are not present in the partial instance (illustrated by dotted lines in FIG. 8).

Thus, the inputs that are terminated in the stub area may be wires that extend to the stub area and are oriented to intersect the edge of the integrated circuit along which the stub area is arranged. The inputs lack a circuit configured to drive the wires within the integrated circuit (e.g., the wires are driven in the full instance by the circuit components that are not present in the partial instance).

In other cases, it may be desirable to substitute a local input for an input from a removed circuit component. For example, a loop back circuit used for testing, or a ring interconnect structure, may complete the loop back/ring locally in a partial instance. To support such instances, the receiving circuit component (e.g., the circuit component 10B) may include the logic circuitry to select between the local signal and the input from the removed component. For example, in FIG. 8, the circuit component 10B may include a plurality of multiplexors (muxes) 58 and 60. Each mux 58 or 60 may be coupled to an input wire normally sourced from a circuit component that is not present in the partial instance. The input wire may reach the stub area 22 but may be a no-connect. Alternatively, the input wire may be terminated in a binary one or zero, if desired. Terminating such an input may prevent it from floating and possibly causing wasted current if the floating input is between power and ground for a significant period. The mux select wire may also be provided from the stub area 22, and may be terminated in a binary 0 ($V_{SS}$) or a binary 1 ($V_{DD}$), which may cause the mux to select the local wire. When the source circuit component of the input wire is present (e.g., in the full instance or a larger partial instance), the mux select wire may be provided from the source circuit component (dotted line in FIG. 8). In such a case, the mux select wire may be a dynamic signal that may select between the local input and the input from the source circuit component as desired during operation, or may be tied to the opposite binary value as compared to the mux select wire in the stub area 22.

Accordingly, in an embodiment of the methodology, the full instance may include the other plurality of circuit components in the second subarea, which may include a plurality of outputs that are a plurality of inputs to the plurality of circuit components in the first subarea. The plurality of circuit components may comprise a plurality of multiplexor circuits having respective ones of the plurality of inputs as inputs. The method may comprise representing, in the stub area, a plurality of select signals for the plurality of multiplexor circuits. The plurality of select signals may be terminated within the stub area with a binary value that selects a different input of the plurality of multiplexor circuits than the mux inputs to which the plurality of inputs are connected. The plurality of select signals may be terminated in the second subarea with a different binary value, in an embodiment.

In an embodiment, an integrated circuit may comprise a plurality of circuit components physically arranged on a surface of a semiconductor substrate forming the integrated circuit. The plurality of the plurality of circuit components include a plurality of multiplexor circuits, wherein a given multiplexor circuit of the plurality of multiplexor circuits has a first input wire, a second input wire, and a select control wire. The integrated circuit may further comprise an area along a single edge of the surface, wherein: the area is an electrical source of the select control wire, the second input wires reach the single edge of the surface and are unconnected, and the select control wires are electrically connected to supply wires of the integrated circuit. A voltage on the supply wires during use corresponds to a digital logic level that causes the plurality of multiplexor circuits to select the first input wires as outputs of the plurality of multiplexor circuits.

Figure 9:
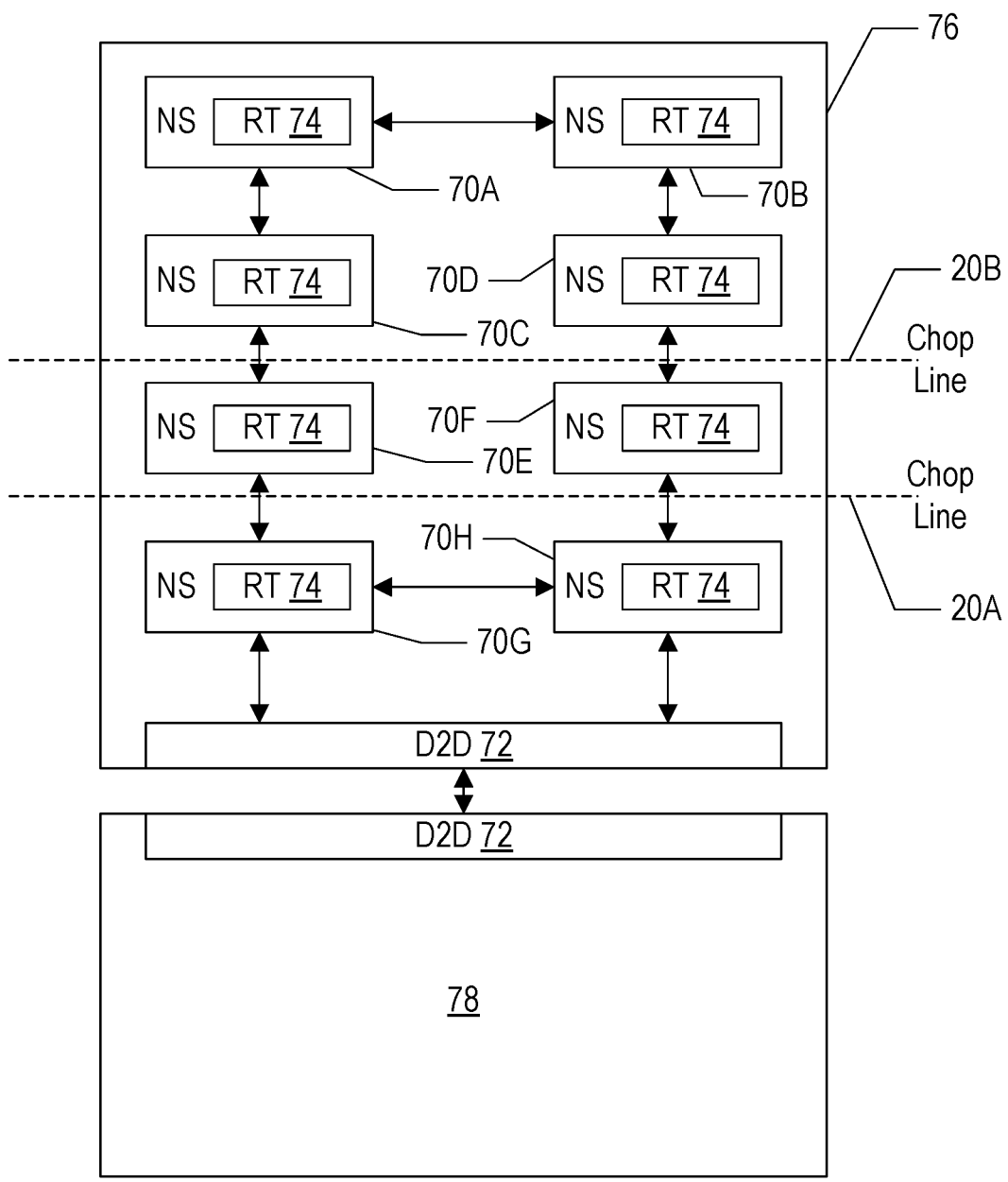
FIG. 9 is a block diagram illustrating one embodiment of a pair of integrated circuits and certain additional details of the pair of integrated circuits.

Turning now to FIG. 9, a block diagram of one embodiment of a pair of integrated circuits 76 and 78, which may be full instances of the chip 18, is shown. The chop lines 20A-20B are shown for the integrated circuit 76, and certain additional details of the integrated circuit 76 are shown for an embodiment. In particular, the integrated circuit 76 may include a plurality of network switches 70A-70H which may be part of a communication network in the integrated circuit 76. The communication network may be an example of circuit components, and may be configured to provide communication between other circuit components (e.g., processors, memory controllers, peripherals, etc.).

The network switches 70A-70H may be coupled to each other using any topology, such as ring, mesh, star, etc. When a given communication message, or packet, is received in a network switch 70A-70H, the network switch 70A-70H may determine which output the packet is to be transmitted on to move the packet toward its destination. The direction may depend on which instance of the integrated circuit the network switches have been fabricated. For example, if the full instance is fabricated, a given network switch such as the network switch 70E may transmit a packet either upward or downward as shown in FIG. 9 (or, if another circuit component, not shown, coupled to the network switch 70E is a target of the packet, the network switch 70E may transmit the packet to that circuit component). However, if a partial instance is formed based on the chop line 20A, the network switch 70E may not transmit packets downward because there is no receiving circuit there. Similarly, network switch 70F may not transmit packets downward in that scenario. If a partial instance is formed by based on the chop line 20B, the network switches 70C and 70D may not transmit packets in the downward direction.

Accordingly, the operation of at least some of the network switches 70A-70H may depend on the instance. There may be multiple ways to manage the differences. For example, an input to the switches may specify the instance (output by the stub areas or by a circuit component in the area below the chop line 20B for the full instance). In the illustrated embodiment, a routing table or other programmable resource 74 may be included in each network switch 70A-70H. The routing table 74 may be programmed at initialization (e.g., by boot code or other firmware) based on the instance that is in place.

Similarly, various instances may have different numbers of memory controllers (e.g., the circuit components in the removed subareas may include memory controllers, and there may be additional memory controllers in the remaining subareas). The memory address space may be mapped onto the memory controllers, and thus the mapping may change based on the number of memory controllers actually existing in a given full or partial instance. The network switches 70A-70H that carry memory operation packets may be programmable with data describing the address mapping using a programmable resource as well. Other circuit components that may need to be informed of the address mapping to operate properly may similarly have a programmable resource.

In the illustrated embodiment, the pair of integrated circuits 76 and 78 may be configured to communicate with each other and act is if they were one integrated circuit die. For example, the network switches 70A-70H on each integrated circuit 76 and 78 may be configured to communicate over a die to die (D2D) interface circuit 72 to form one communication interconnect across the integrated circuits 76 and 78. Thus, a packet originating on either integrated circuit die may have a destination on the other integrated circuit die and may be transmitted to the target, via the D2D interface circuits 72, seamlessly and thus essentially not visible to software executing in the system.

Since the partial instances of the integrated circuit is including less than a full instance of circuitry, one of the component circuits that may be removed from each of the partial instances is the D2D interface circuit 72. That is, the D2D interface circuit 72 may be instantiated in the subarea that is removed from each of the partial instances (e.g., below the chop line 20A in the illustrated embodiment).

Figure 10:
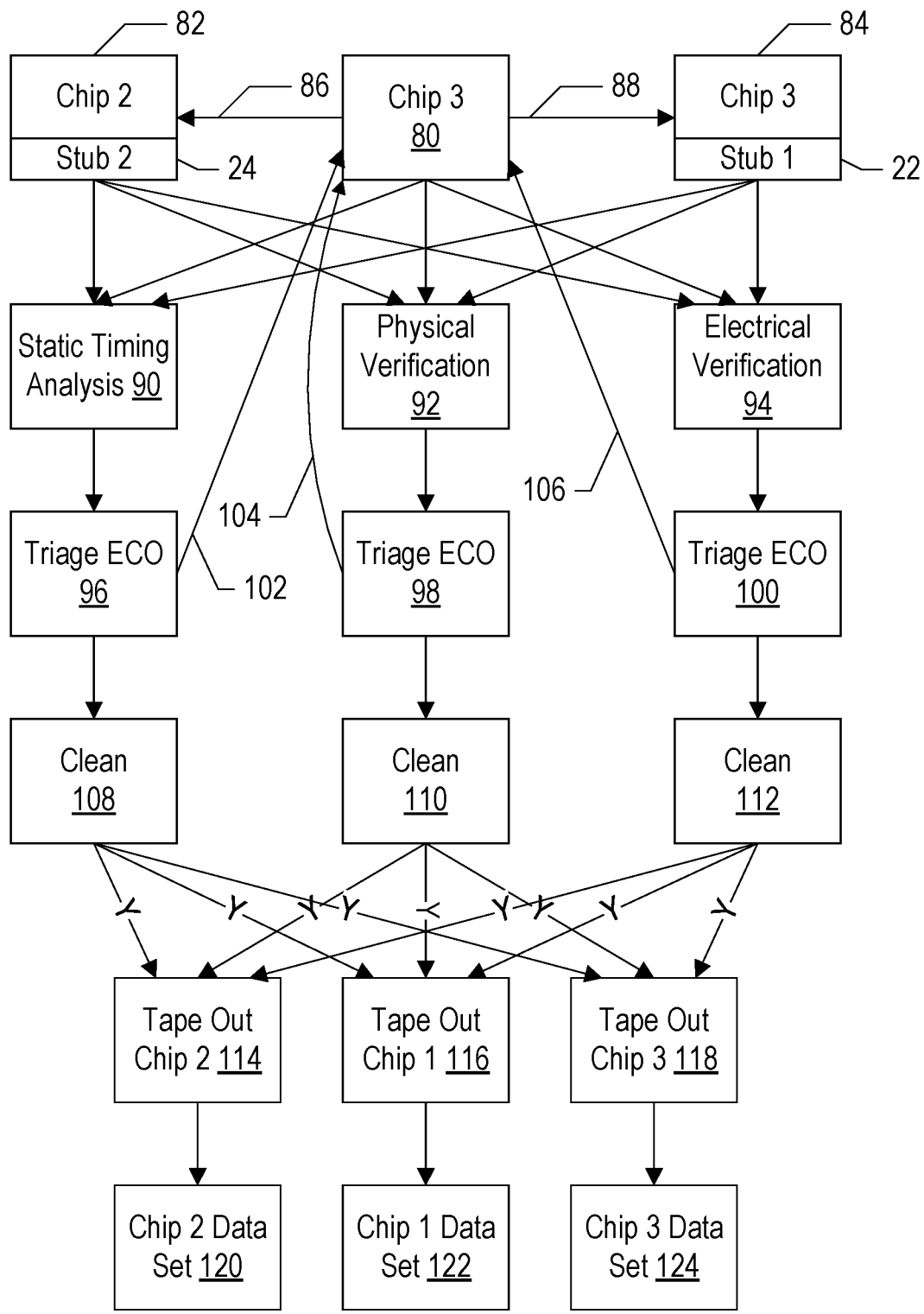
FIG. 10 is a flow diagram illustrating one embodiment of an integrated circuit design methodology.

FIG. 10 is a flow diagram illustrating various portions of the design and validation/verification methodology for one embodiment of an integrated circuit that supports full and partial instances. The design database for the full instance is shown at the top center of FIG. 10 (reference numeral 80). The design databases for the partial instances are shown to the left and right of the full instance (reference numerals 82 and 84). The design databases 82 and 84 draw the content for the subareas forming those integrated circuits from the design database 80, as indicated by the arrows 86 and 88, along with the corresponding stub areas 22 and 24 as shown in FIG. 10.

The databases 80, 82, and 84 may be analyzed using static timing analysis to verify that the designs meet timing requirements (block 90), physical verification to verify that the designs meet various physical design rules (block 92), and electrical verification to verify that the designs (along with the package to be used for each design, which may vary between the full and partial instances) meeting electrical requirements such as power grid stability, impedance, etc. (block 94). The physical design rules may include features such as minimum spacings between devices and/or wiring in the wiring layers, device sizes, etc. The physical design rules may also include the corner exclusion, C4 bump exclusions, etc. as mentioned above. Additionally, in an embodiment, there may be additional "antenna" rules to be dealt with because of the outputs from circuit components that are no-connects in the partial instances.

The results of the various verification steps may be reviewed and triaged for design changes (engineering change orders, or ECOs) that may be expected to improve the results in subsequent runs of the various verifications (Triage ECO blocks 96, 98, and 100). The ECOs may be implemented in the design database 80 (arrows 102, 104, and 106), regardless of which instance resulted in the ECO. Thus, the design database 80 may be somewhat overdesigned if the worst-case correction needed in the design resulted from one of the partial instances. The design databases 82 and 84 may be extracted from the design database 80 after the changes are made to update the partial instances, in cases where changes were made in a subarea included in the partial instances.

Once the various verifications are completed (clean blocks 108, 110, and 112), tape outs may be performed for the full instance and the partial instances (blocks 114, 116, and 118), resulting in the data sets for each instance (blocks 120, 122, and 124).

There may be additional analysis and design flows in various embodiments, but similarly any ECOs identified by the various design efforts may be implemented in the full instance design database 80 and then extract to the partial design databases 82 and 84.

Another area the integrated circuit design methodology that may be impacted by the support for full and partial instances of an integrated circuit design is design validation (DV). DV generally includes testing an integrated circuit design, or portion thereof such as a given circuit component, to ensure that the design operates as expected and meets the functional and/or performance requirements for the design. For example, DV may include defining a test bench to stimulate the design and measure operation against expected results. The test bench may include, for example, additional HDL code describing the stimulus. To avoid significant rework and additional resources to perform DV on all instances of the design, a configurable test bench environment may be defined that covers each instance. At the component level, reproduction of chip-level differences among the instances may be used to test the components.

Figure 11:
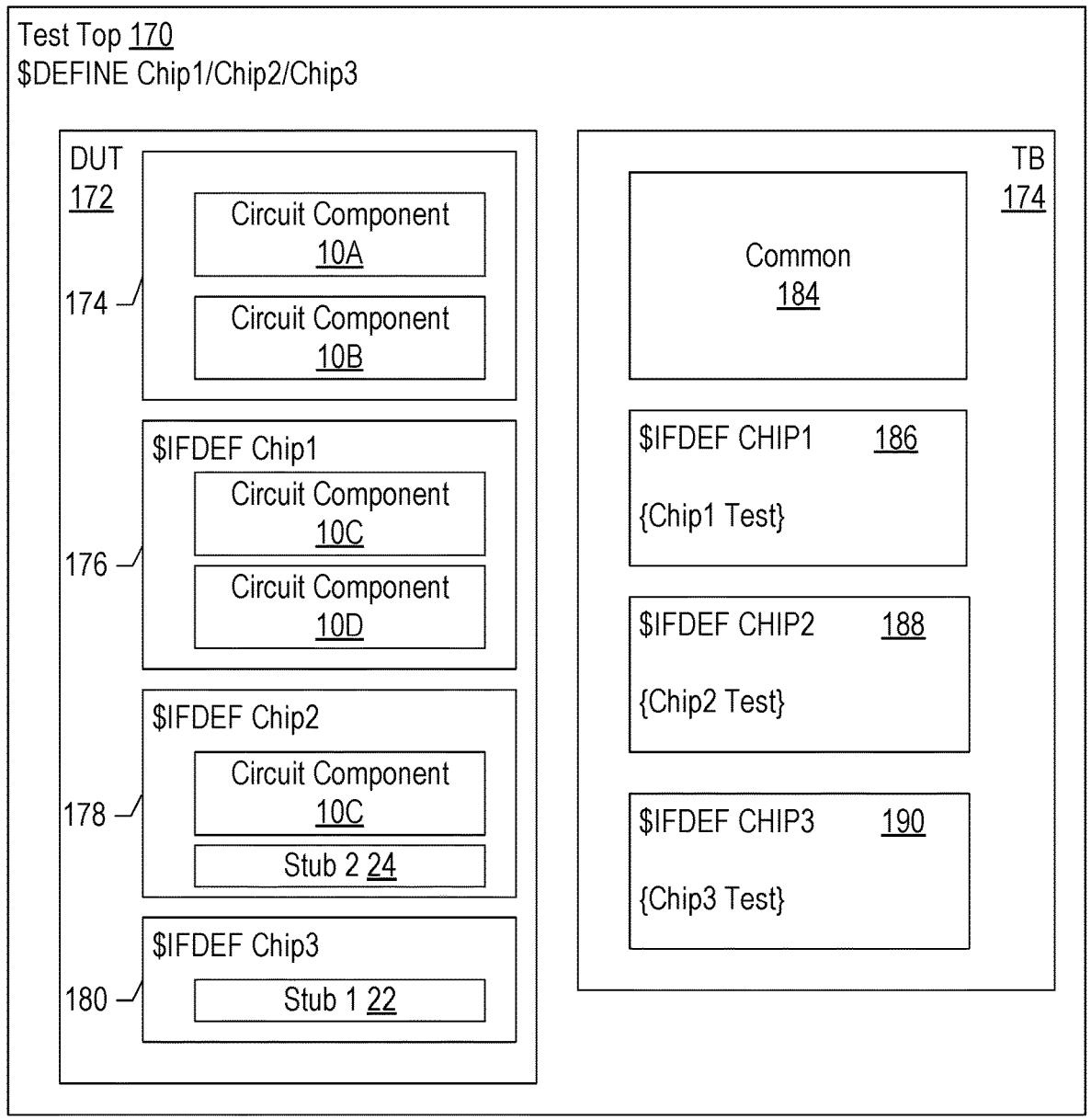
FIG. 11 is a block diagram illustrating a test bench arrangement for testing the full and partial instances.

FIG. 11 is a block diagram illustrating one embodiment of a test bench arrangement for chip-level DV. The test bench may include a test top level 170 that may include a define statement ($DEFINE) which can be selected to be Chip1 (full instance), Chip2 (partial instance), or Chip3 (partial instance) in this example. That is, for a given simulation, the $DEFINE statement may be set to the instance being tested (one of the labels Chip1, Chip2, or Chip3). The test top level 170 may further include the device under test (DUT) 172 (e.g., the integrated circuit in its partial and full instances) and a test bench (TB) 174.

The DUT 172 may include the portion of the integrated circuit that is included in each of the instances (e.g., circuit components 10A-10B in this example, that are common to each instance). The common portion 176 may be unconditionally included in the DUT 172 for a given simulation. One of three additional portions may be conditionally included depending on which instance is being tested in the given simulation. For example, in Chip 1 is being tested (and thus the $DEFINE statement recites Chip1), the other circuit components 10C-10D may be included (reference numeral 178). If Chip 2 is being tested (and thus the $DEFINE statement recites Chip2), the circuit component 10C and the stub 24 may be included (reference numeral 180). If Chip 3 is being tested (and thus the $DEFINE statement recites Chip3), the stub 22 may worst-case be included (reference numeral 182).

The test bench 174 may similarly be configurable based on the $DEFINE statement. The test bench 174 may include a common portion 184 that corresponds to the common portion 176 (e.g., stimulus for the common portion 176). Other portions 184, 186, or 188 may be selectively included based on the $DEFINE statement reciting Chip1, Chip2, and Chip3 respectively. The stimulus for the corresponding portions 178, 180, and 182, respectively may be included. That is, the stimulus for the combination of circuit components 10C-10D may be included in portion 186; the stimulus for the combination of circuit component 10C and the stub 24 may be included in portion 188; and the stimulation for the stub 22 may be included in portion 190. In an embodiment, since the stub 22 may not include any active circuitry, the portion 190 may be omitted. Alternatively, differences in operation in the common portion 176 may be captures in the portion 190.

Thus, the same overall setup of the test top level 170 allows for the simulation of any instance of the design with only the change of the $DEFINE statement to select the design.

Figure 12:
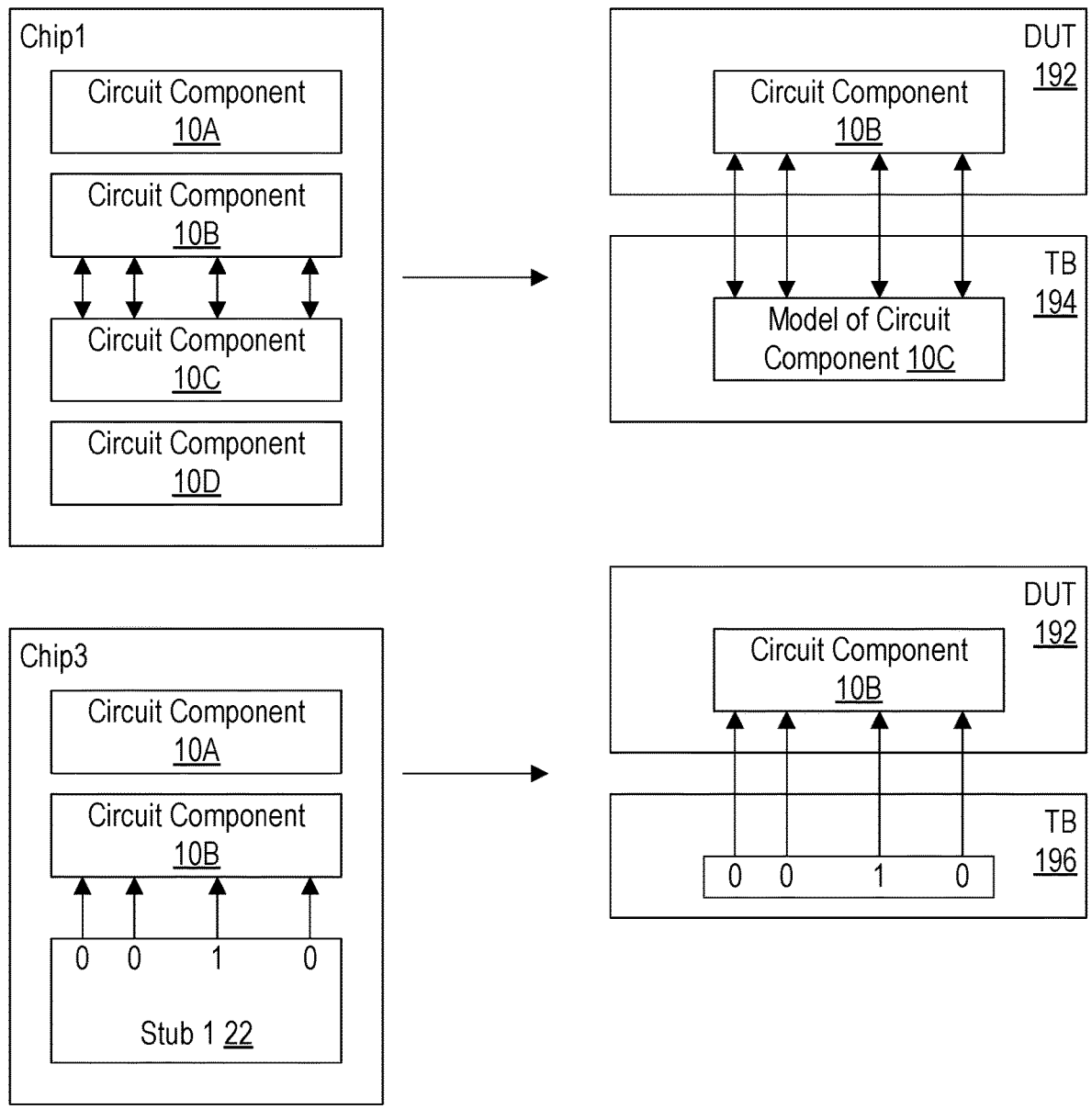
FIG. 12 is a block diagram illustrating a test bench arrangement for component-level testing.

FIG. 12 illustrates an example of circuit component-level testing via replication. In the example, chip 1 is shown with certain inputs/outputs (e.g., an interface) between the circuit component 10C and the circuit component 10B. Other interfaces between other ones of the circuit components 10A and 10D and received by the circuit component 10B but they are not illustrated in FIG. 12 for simplicity.

A test arrangement for the circuit component 10B may thus include the circuit component 10B in the DUT (reference numeral 192). The interface between the circuit component 10B and the circuit component 10C may be modeled via a model of the circuit component 10C in the test bench 194. The model may be a behavioral model of the circuit component 10C. Alternatively, the model may be a bus function model of the circuit component 10C, that faithfully reproduces operation of the circuit component 10C on the interface but may omit many internal operations. Any model may be used. The test arrangement may be duplicated to test the chip 3 arrangement, for example, in which the stub 22 is included to tie up and tie down various input signals to the circuit component 10B on the interface that were sourced from the circuit component 10C. The reproduced arrangement many include the DUT 192 and a test bench 196 that instantiates the tie ups and tie downs of the stub 22.

In an embodiment, design integration (DI) may be modified as well. Design integration may include the process of connecting the various circuit components 10A-10D, providing any needed "glue logic" that may allow correct communication between the circuit components 10A-10D, etc. Various configuration may change when different instances of the integrated circuit are taped-out. For example, routing of packets via the network switches 70A-70H (or the subsets of the switches included in a given instance) may depend on the instance. The programming of the routing tables 74 may thus change based on the instance. Other behaviors of the design may change as well, such as power management. Fuses may be used to identify the instance, and thus the programming of the routing tables 74 or various configuration registers in other circuit components 10A-10D if the behavior are not adequately controlled by pullups and pull downs in the stubs 22 or 24. The fuses may be part of the stubs, or may be included in the circuit components 10A-10D and may be selectively blown for a given instance.

Figure 13:
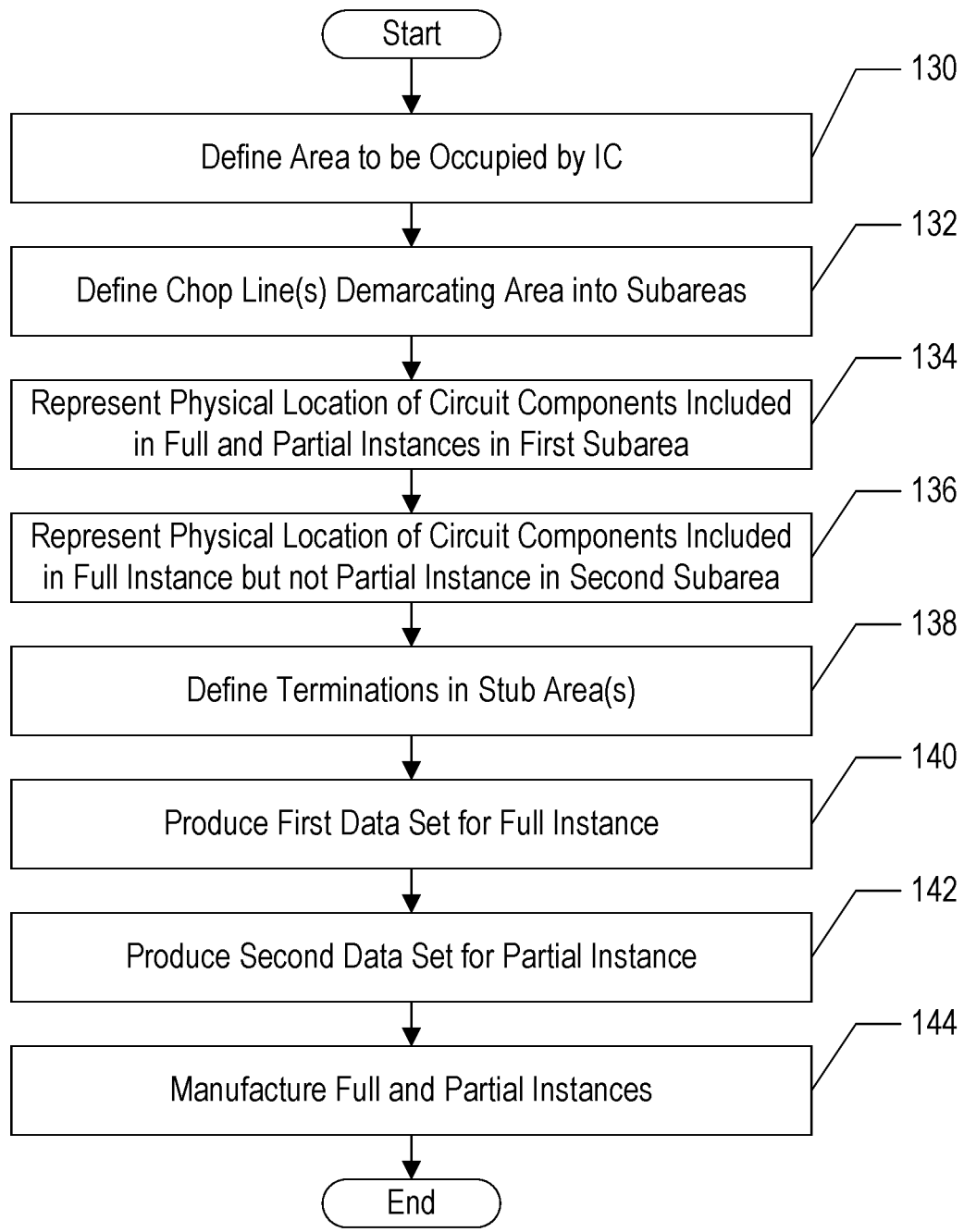
FIG. 13 is a flowchart illustrating one embodiment of a design and manufacturing method for an integrated circuit.

FIG. 13 is a flowchart illustrating one embodiment of a design and manufacturing method for an integrated circuit. While the blocks are shown in a particular order for ease of understanding, other orders may be used. Blocks that are independent may be performed in parallel.

The method may comprise defining, in a design database corresponding to an integrated circuit design, an area to be occupied by the integrated circuit design when fabricated on a semiconductor substrate (block 130). The method may further comprise defining a chop line, or more than one chop line as desired. The chop line may demarcate the area into a first subarea and a second subarea, wherein a combination of the first subarea and the second subarea represents a full instance of the integrated circuit, and wherein the first subarea and a stub area represents a partial instance of the integrated circuit that includes fewer circuit components than the full instance (block 132). The method may further comprise representing, in the design database, a physical location of a plurality of circuit components included in both the full instance and the partial instance of the integrated circuit in the first subarea (block 134). In an embodiment, a relative location of the plurality of circuit components within the first subarea and the interconnect of the plurality of circuit components within the first subarea is unchanged in the full instance and the partial instance. The method may further comprise representing, in the design database, a physical location of another plurality of circuit components included in the full instance but excluded from the partial instance in the second subarea (block 136). The method may further comprise defining, in the stub area in the design database, terminations for wires that would otherwise traverse the chop line between the first and second subareas, ensuring correct operation of the plurality of circuit components in the first subarea in the absence of the second subarea in the partial instance (block 138). The method may further comprise producing a first data set for the full instance using the first subarea and the second subarea (block 140). The first data set may define the full instance for manufacturing the full instance. The method may further comprise producing a second data set for the partial instance using the first subarea and the stub area, the second data set defining the partial instance for manufacture of the partial instance (block 142). The method may further comprise manufacturing full and partial instances based on the first and second data sets, respectively (block 144).

In an embodiment, the stub area may exclude circuitry. For example, the stub area may include only wiring in one or more metallization layers above a surface area of the semiconductor substrate. In an embodiment, the other plurality of circuit components in the second subarea may include a plurality of outputs that are a plurality of inputs to the plurality of circuit components in the first subarea. The plurality of circuit components may comprise a plurality of multiplexor circuits having respective ones of the plurality of inputs as inputs. The method may further comprise representing, in the stub area, a plurality of select signals for the plurality of multiplexor circuits. The plurality of select signals may be terminated within the stub area with a binary value that selects a different input of the plurality of multiplexor circuits than the inputs to which the plurality of inputs are connected. The plurality of select signals may be terminated in the second subarea with a different binary value.

In an embodiment, the method may further comprise defining a plurality of exclusion zones at respective corners of the semiconductor substrate. Circuit components may be excluded from the plurality of exclusion zones according to mechanical requirements of a fabrication process to be employed to manufacture the integrated circuit. The method may still further comprise defining additional exclusion zones at corners of the first subarea adjacent to the chop line, whereby the partial instance includes exclusion zones at respective corners of the semiconductor substrate with the partial instance formed thereon.

In an embodiment, the method may further comprise defining a second exclusion zone along an edge of the first subarea that is adjacent to the second subarea. Controlled collapse chip connection (C4) connections may be excluded from the second exclusion zone. In an embodiment, the method may further comprise defining, in the first subarea, one or more first analog inputs; and defining, in the second subarea, one or more second analog inputs. The one or more first remain within the first subarea and the one or more second analog inputs remain within the second subarea. In an embodiment, the method may comprise defining, in the first subarea, one or more first clock trees to distribute clocks within the first subarea; and defining, in the second subarea, one or more second clock trees to distributed clocks with the second subarea. The one or more first clock trees may be electrically isolated from the one or more second clock trees in the full instance. In an embodiment, the method may further comprise defining, in the design database, a second chop line in the second subarea. The second chip line may divide the second subarea into a third subarea and a fourth subarea, wherein the third subarea is adjacent to the first subarea. The third subarea and the first subarea may represent a second partial instance of the integrated circuit. The method may further comprises producing a third data set for the second partial instance using the first subarea, the third subarea, and a second stub area. The third data set may define the second partial instance for manufacture of the second partial instance.

Figure 14:
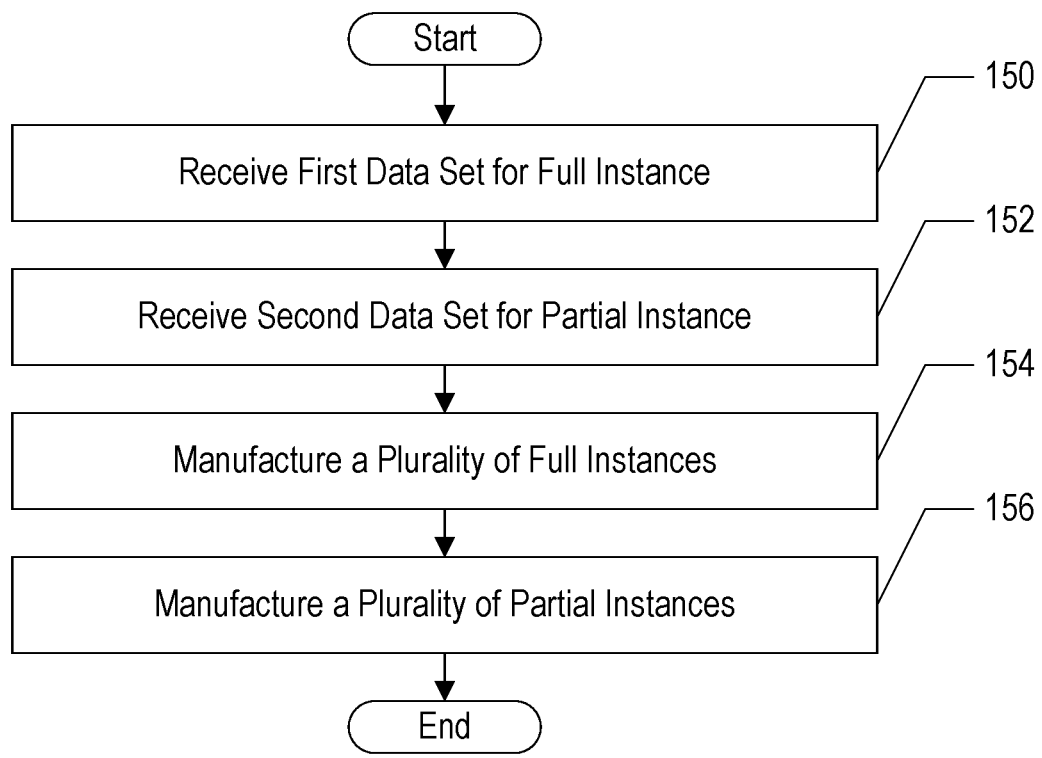
FIG. 14 is a flowchart illustrating one embodiment of a method to manufacture integrated circuits.

FIG. 14 is a flowchart illustrating one embodiment of a method to manufacture integrated circuits. While the blocks are shown in a particular order for ease of understanding, other orders may be used. Blocks that are independent may be performed in parallel.

In an embodiment, a method may comprise receiving a first data set for a full instance of an integrated circuit design (block 150). The first data set may define the full instance for manufacturing the full instance. The full instance may include a first plurality of circuit components physically located in a first subarea of an area occupied on a semiconductor substrate by the full instance and a second plurality of circuit components physically located in a second subarea of the area occupied on the semiconductor substrate by the full instance. The method may further comprise receiving a second data set for a partial instance of the integrated circuit design (block 152). The second data set may define the partial instance for manufacturing the partial instance. The partial instance may include the first plurality of circuit components in the first subarea, wherein a relative location of the first plurality of circuit components within the first subarea and the interconnect of the first plurality of circuit components within the first subarea is unchanged in the full instance and the partial instance. The partial instance may further include a stub area adjacent to the first subarea, wherein the stub area includes terminations for wires that would otherwise interconnect components in the first and second subareas, ensuring correct operation of the first plurality of circuit components in the first subarea in the absence of the second subarea in the partial instance. The method may further comprise manufacturing a first plurality of the full instance of the integrated circuit based on the first data set (block 154); and manufacturing a second plurality of the partial instance of the integrated circuit based on the second data set (block 156).

In an embodiment, the stub area excludes circuitry. For example, the stub area may include only wiring in one or more metallization layers above a surface area of the semiconductor substrate. In an embodiment, the other plurality of circuit components in the second subarea include a plurality of outputs that are a plurality of inputs to the first plurality of circuit components in the first subarea; and the first plurality of circuit components comprise a plurality of multiplexor circuits having respective ones of the plurality of inputs as inputs. The stub area may further comprise a plurality of select signals for the plurality of multiplexor circuits. In an embodiment, the plurality of select signals are terminated within the stub area with a binary value that selects a different input of the plurality of multiplexor circuits than the inputs to which the plurality of inputs are connected. The plurality of select signals may be terminated in the second subarea with a different binary value in the full instance.

In an embodiment, the first data set may include a plurality of exclusion zones at respective corners of the semiconductor substrate. Circuit components may be excluded from the plurality of exclusion zones according to mechanical requirements of a fabrication process to be employed to manufacture the integrated circuit. The first data set may further include additional exclusion zones at corners of the first subarea adjacent to the second subarea, whereby the partial instance includes exclusion zones at respective corners of the semiconductor substrate with the partial instance formed thereon. In an embodiment, the first data set may further include a second exclusion zone along an edge of the first subarea that is adjacent to the second subarea, wherein controlled collapse chip connection (C4) connections are excluded from the second exclusion zone. In an embodiment, the first data set may further include one or more first analog inputs in the first subarea and one or more second analog inputs in the second subarea. The one or more first analog inputs may remain with the first subarea; and the one or more second analog inputs remain within the second subarea. In an embodiment, the first data set may further comprise one or more first clock trees to distribute clocks within the first subarea and one or more second clock trees to distributed clocks with the second subarea, and wherein the one or more first clock trees are electrically isolated from the one or more second clock trees in the full instance.

Computer Readable Storage Medium

Figure 15:
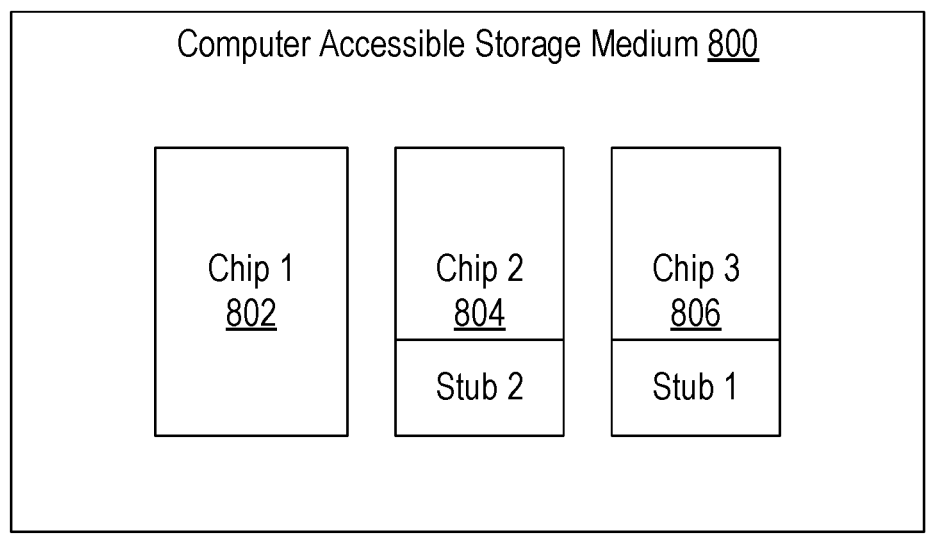
FIG. 15 is a block diagram of one embodiment to a computer accessible storage medium.

Turning now to FIG. 15, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 15 may store databases 802, 804, and 806 representative of the full instance of the integrated circuit and the partial instances of the integrated circuit. Generally, the databases 802, 804, and 806 may be a database which can be read by a program and used, directly or indirectly, to fabricate the hardware comprising the instances. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the instances. The netlist may then be placed and routed to produce a data set describing geometric shapes to be applied to masks. The masks may then be used in various semiconductor fabrication steps to produce a semiconductor circuit or circuits corresponding to the instances. Alternatively, the databases 802, 804, and 806 on the computer accessible storage medium 800 may be the netlist (with or without the synthesis library) or the data set, as desired.

While the computer accessible storage medium 800 stores a representation of the instances, other embodiments may carry a representation of any portion of the instances, as desired.

Computer System

Figure 16:
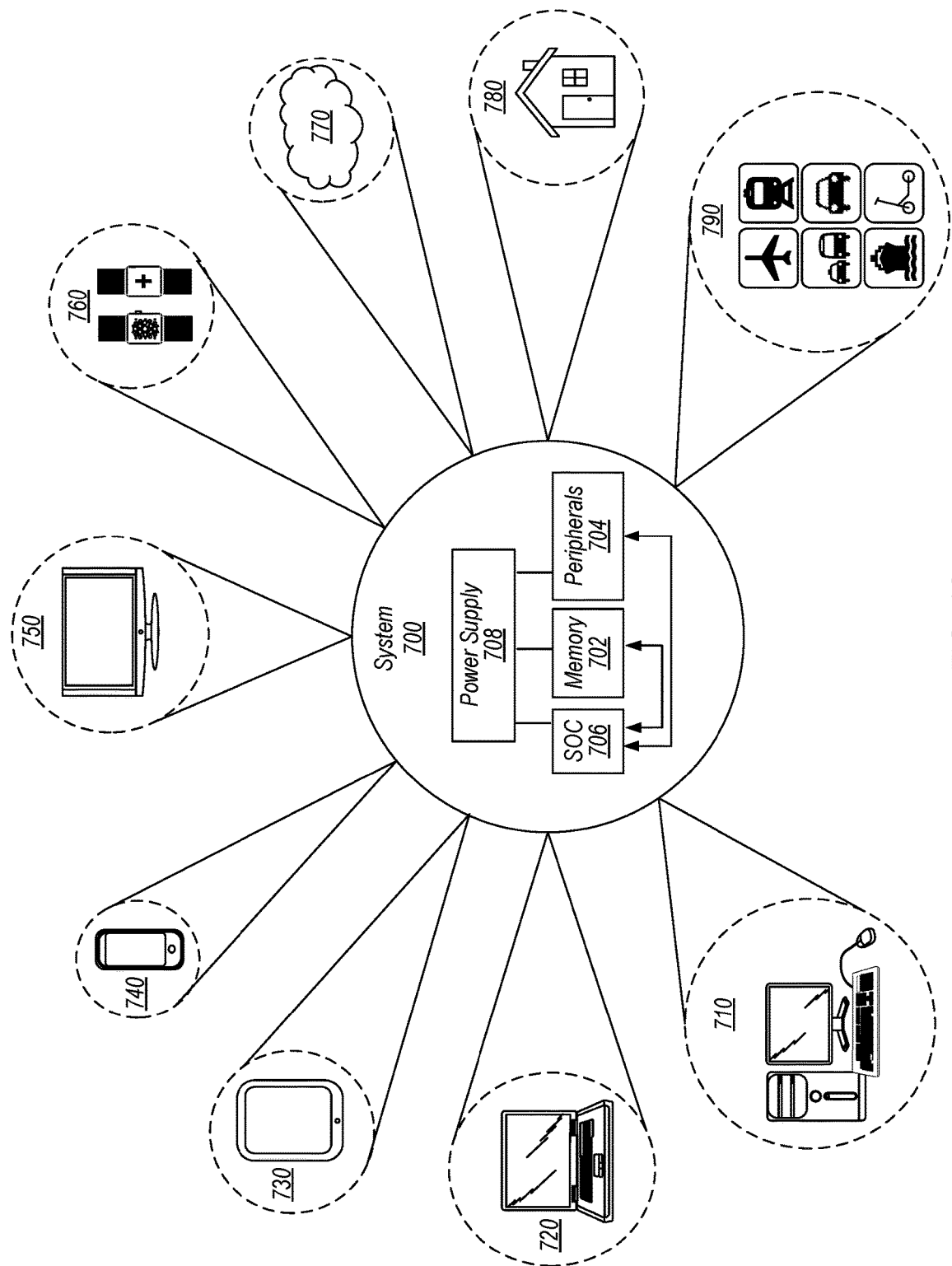
FIG. 16 is a block diagram of a variety of systems that may employ integrated circuits.

Turning next to FIG. 16, a block diagram of one embodiment of a system 700 is shown. In the illustrated embodiment, the system 700 includes at least one instance of a system on a chip (SOC) 706 coupled to one or more peripherals 704 and an external memory 702. A power supply (PMU) 708 is provided which supplies the supply voltages to the SOC 10 as well as one or more supply voltages to the memory 702 and/or the peripherals 704. In some embodiments, more than one instance of the SOC 706 may be included (and more than one memory 702 may be included as well). More particularly, the SOC 706 may be any of the instances of the integrated circuit described herein (e.g., full or partial).

The peripherals 704 may include any desired circuitry, depending on the type of system 700. For example, in one embodiment, the system 704 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 706 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 16 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 16 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Realizations of the subject matter of this application include, but are not limited to, the following examples:
Method Examples:
1. A method comprising:
    receiving a first data set for a full instance of an integrated circuit design, the first data set defining the full instance for manufacturing the full instance, wherein the full instance includes a first plurality of circuit components physically located in a first subarea of an area occupied on a semiconductor substrate by the full instance and a second plurality of circuit components physically located in a second subarea of the area occupied on the semiconductor substrate by the full instance;
    receiving a second data set for a partial instance of the integrated circuit design, the second data set defining the partial instance for manufacturing the partial instance, wherein the partial instance includes the first plurality of circuit components in the first subarea, wherein a relative location of the first plurality of circuit components within the first subarea and the interconnect of the first plurality of circuit components within the first subarea is unchanged in the full instance and the partial instance, and wherein the partial instance further includes a stub area adjacent to the first subarea, wherein the stub area includes terminations for wires that would otherwise interconnect components in the first and second subareas, ensuring correct operation of the first plurality of circuit components in the first subarea in the absence of the second subarea in the partial instance;
    manufacturing a first plurality of the full instance of the integrated circuit based on the first data set; and
    manufacturing a second plurality of the partial instance of the integrated circuit based on the second data set.
2. The method as recited in example 1 wherein the stub area excludes circuitry.
3. The method as recited in example 2 wherein the stub area includes only wiring in one or more metallization layers above a surface area of the semiconductor substrate.
4. The method as recited in example 1 wherein the other plurality of circuit components in the second subarea include a plurality of outputs that are a plurality of inputs to the first plurality of circuit components in the first subarea, and wherein the first plurality of circuit components comprise a plurality of multiplexor circuits having respective ones of the plurality of inputs as inputs, and the stub area further comprises a plurality of select signals for the plurality of multiplexor circuits.
5. The method as recited in example 4 wherein the plurality of select signals are terminated within the stub area with a binary value that selects a different input of the plurality of multiplexor circuits than the inputs to which the plurality of inputs are connected.
6. The method as recited in example 5 wherein the plurality of select signals are terminated in the second subarea with a different binary value in the full instance.
7. The method as recited in example 1 wherein the first data set includes a plurality of exclusion zones at respective corners of the semiconductor substrate, wherein circuit components are excluded from the plurality of exclusion zones according to mechanical requirements of a fabrication process to be employed to manufacture the integrated circuit; and wherein the first data set includes additional exclusion zones at corners of the first subarea adjacent to the second subarea, whereby the partial instance includes exclusion zones at respective corners of the semiconductor substrate with the partial instance formed thereon.
8. The method as recited in example 1 wherein the first data set further includes a second exclusion zone along an edge of the first subarea that is adjacent to the second subarea, wherein controlled collapse chip connection (C4) connections are excluded from the second exclusion zone.
9. The method as recited in example 1 wherein the first data set further includes one or more first analog inputs in the first subarea, wherein the one or more first analog inputs remain with the first subarea, and wherein the first data set further includes one or more second analog inputs in the second subarea, wherein the one or more second analog inputs remain within the second subarea.
10. The method as recited in example 1 wherein the first data set further comprises one or more first clock trees to distribute clocks within the first subarea and one or more second clock trees to distributed clocks with the second subarea, and wherein the one or more first clock trees are electrically isolated from the one or more second clock trees in the full instance.
Integrated Circuit Examples:
11. An integrated circuit comprising:
    a plurality of circuit components physically arranged on a surface of a semiconductor substrate forming the integrated circuit, wherein a plurality of the plurality of circuit components include a plurality of multiplexor circuits, wherein a given multiplexor circuit of the plurality of multiplexor circuits has a first input wire, a second input wire, and a select control wire; and
    an area along a single edge of the surface, wherein:
    the area is an electrical source of the select control wire,
    the second input wires reach the single edge of the surface and are unconnected, and
    the select control wires are electrically connected to supply wires of the integrated circuit, wherein a voltage on the supply wires during use corresponds to a digital logic level that causes the plurality of multiplexor circuits to select the first input wires as outputs of the plurality of multiplexor circuits.
12. An integrated circuit comprising:
    a first plurality of circuit components physically arranged within a first area of a surface of a semiconductor substrate forming the integrated circuit;
    a plurality of exclusion zones at respective corners of the semiconductor substrate, wherein circuit components are excluded from the plurality of exclusion zones according to mechanical requirements of a fabrication process employed to manufacture the integrated circuit; and
    another plurality of exclusion zones separate from the respective corners along a pair of nominally parallel edges of the semiconductor substrate, wherein circuit components are excluded from the other plurality of exclusion zones, and wherein the other plurality of exclusion zones are dimensioned substantially the same as the plurality of exclusion zones.
13. The integrated circuit as recited in example 12 further comprising:
    a second exclusion zone along a line between the pl of exclusion zones, wherein controlled collapse chip connection (C4) connections are excluded from the second exclusion zone.
14. The integrated circuit as recited in example 12 further comprising:
    one or more first analog inputs in a first subarea of the first area, wherein the one or more first analog inputs remain with the first subarea; and one or more second analog inputs in a second subarea of the first area and adjacent to the first subarea, wherein the one or more second analog inputs remain within the second subarea.

15. The integrated circuit as recited in example 12 further comprising:
    one or first more clock trees to distribute clocks within a first subarea of the first area; and
    one or more second clock trees to distributed clocks with the second subarea; and
    wherein the one or more first clock trees are electrically isolated from the one or more second clock trees.

16. An integrated circuit comprising:
    a first plurality of circuit components physically arranged within a first area of a surface of a semiconductor substrate forming the integrated circuit;
    a second plurality of circuit components physically arranged within a second area of the surface of the semiconductor substrate forming the integrated circuit;
    one or more first analog inputs within the first area, wherein the one or more first analog inputs are isolated to the first plurality of circuit components; and
    one or more second analog inputs within the second area, wherein the one or more second analog inputs are isolated to the second plurality of circuit components.

Numerous variations and modifications will become apparent to those skilled in the art once the above disclosure is fully appreciated. It is intended that the following claims be interpreted to embrace all such variations and modifications.

What is claimed is:

1. A method comprising:
    defining, in a design database corresponding to an integrated circuit design, an area to be occupied by the integrated circuit design when fabricated on a semiconductor substrate;
    defining a chop line that demarcates the area into a first subarea and a second subarea, wherein a combination of the first subarea and the second subarea represents a full instance of the integrated circuit, and wherein the first subarea and a stub area represents a partial instance of the integrated circuit that includes fewer circuit components than the full instance;
    representing, in the design database, a physical location of a plurality of circuit components included in both the full instance and the partial instance of the integrated circuit in the first subarea, wherein a relative location of the plurality of circuit components within the first subarea and an interconnect of the plurality of circuit components within the first subarea is unchanged in the full instance and the partial instance;
    representing, in the design database, a physical location of another plurality of circuit components included in the full instance but excluded from the partial instance in the second subarea;
    defining, in the stub area in the design database, terminations for wires that traverse the chop line between the first and second subareas in the full instance, ensuring correct operation of the plurality of circuit components in the first subarea in the absence of the second subarea in the partial instance;
    producing a first data set for the full instance using the first subarea and the second subarea, the first data set defining the full instance for manufacturing the full instance;
    producing a second data set for the partial instance using the first subarea and the stub area, the second data set defining the partial instance for manufacture of the partial instance;
    transmit the first data set for use in manufacturing a plurality of full instances; and
    transmit the second data set for use in manufacturing a plurality of partial instances.

2. The method as recited in claim 1 wherein the stub area excludes circuitry.

3. The method as recited in claim 2 wherein the stub area includes only wiring in one or more metallization layers above a surface area of the semiconductor substrate.

4. The method as recited in claim 1 wherein the other plurality of circuit components in the second subarea include a plurality of outputs that are a plurality of inputs to the plurality of circuit components in the first subarea, and wherein the plurality of circuit components comprise a plurality of multiplexor circuits having respective ones of the plurality of inputs as inputs, and wherein the method further comprises representing, in the stub area, a plurality of select signals for the plurality of multiplexor circuits.

5. The method as recited in claim 4 wherein the plurality of select signals are terminated within the stub area with a binary value that selects a different input of the plurality of multiplexor circuits than the inputs to which the plurality of inputs are connected.

6. The method as recited in claim 5 wherein the plurality of select signals are terminated in the second subarea with a different binary value in the full instance.

7. The method as recited in claim 1 further comprising:
    defining a plurality of exclusion zones at respective corners of the semiconductor substrate, wherein circuit components are excluded from the plurality of exclusion zones according to mechanical requirements of a fabrication process to be employed to manufacture the integrated circuit; and
    defining additional exclusion zones at corners of the first subarea adjacent to the chop line, whereby the partial instance includes exclusion zones at respective corners of the semiconductor substrate with the partial instance formed thereon.

8. The method as recited in claim 1 further comprising:
    defining a second exclusion zone along an edge of the first subarea that is adjacent to the second subarea, wherein controlled collapse chip connection (C4) connections are excluded from the second exclusion zone.

9. The method as recited in claim 1 further comprising:
    defining, in the first subarea, one or more first analog inputs; and
    defining, in the second subarea, one or more second analog inputs; and
    wherein the one or more first analog inputs remain within the first subarea and the one or more second analog inputs remain within the second subarea.

10. The method as recited in claim 1 further comprising:
    defining, in the first subarea, one or more first clock trees to distribute clocks within the first subarea; and
    defining, in the second subarea, one or more second clock trees to distribute clocks within the second subarea; and
    wherein the one or more first clock trees are electrically isolated from the one or more second clock trees in the full instance.

11. The method as recited in claim 1 further comprising:
    defining a second chop line in the second subarea, dividing the second subarea into a third subarea and a fourth subarea, wherein the third subarea is adjacent to the first subarea, and wherein the third subarea and the first subarea represent a second partial instance of the integrated circuit; and producing a third data set for the second partial instance using the first subarea, the third subarea, and a second stub area, the third data set defining the second partial instance for manufacture of the second partial instance.

12. The method as recited in claim 1 further comprising: defining a test bench environment for the integrated circuit, wherein:
the test bench environment unconditionally includes the plurality of circuit components included in both the full instance and the partial instance of the integrated circuit;
the test bench environment conditionally includes the other plurality of circuit components included in the full instance but excluded from the partial instance based on the full instance being tested;
the test bench environment conditionally includes the stub area based on the partial instance being tested;
the test bench environment unconditionally includes a first test stimulus for the plurality of circuit components included in both the full instance and the partial instance of the integrated circuit; and
the test bench environment conditionally includes a second test stimulus for the other plurality of circuit components included in the full instance but excluded from the partial instance based on the full instance being tested.

13. The method as recited in claim 1 further comprising: detecting a required change in the integrated circuit during validation of the integrated circuit design;
implementing the required change in the design database for the full instance; and
extracting the design database for the partial instance from the design database for the full instance.

14. The method as recited in claim 1, further comprising: manufacturing a first plurality of the full instance of the integrated circuit based on the first data set; and
manufacturing a second plurality of the partial instance of the integrated circuit based on the second data set.

15. A method comprising:
receiving a first data set for a full instance of an integrated circuit design, the first data set defining the full instance for manufacturing the full instance, wherein the full instance includes a first plurality of circuit components physically located in a first subarea of an area occupied on a semiconductor substrate by the full instance and a second plurality of circuit components physically located in a second subarea of the area occupied on the semiconductor substrate by the full instance;
receiving a second data set for a partial instance of the integrated circuit design, the second data set defining the partial instance for manufacturing the partial instance, wherein the partial instance includes the first plurality of circuit components in the first subarea, wherein a relative location of the first plurality of circuit components within the first subarea and an interconnect of the first plurality of circuit components within the first subarea is unchanged in the full instance and the partial instance, and wherein the partial instance further includes a stub area adjacent to the first subarea, wherein the stub area includes terminations for wires that interconnect components in the first and second subareas in the full instance, ensuring correct operation of the first plurality of circuit components in the first subarea in the absence of the second subarea in the partial instance;
storing the received first data set and the received second data set;
manufacturing a first plurality of the full instance of the integrated circuit based on the stored first data set; and
manufacturing a second plurality of the partial instance of the integrated circuit based on the stored second data set.

16. The method as recited in claim 15 wherein the stub area excludes circuitry.

17. The method as recited in claim 15 wherein the first data set includes a plurality of exclusion zones at respective corners of the semiconductor substrate, wherein circuit components are excluded from the plurality of exclusion zones according to mechanical requirements of a fabrication process to be employed to manufacture the integrated circuit; and wherein the first data set includes additional exclusion zones at corners of the first subarea adjacent to the second subarea, whereby the partial instance includes exclusion zones at respective corners of the semiconductor substrate with the partial instance formed thereon.

18. The method as recited in claim 15 wherein the first data set further includes a second exclusion zone along an edge of the first subarea that is adjacent to the second subarea, wherein controlled collapse chip connection (C4) connections are excluded from the second exclusion zone.

19. The method as recited in claim 15 wherein the first data set further includes one or more first analog inputs in the first subarea, wherein the one or more first analog inputs remain within the first subarea, and wherein the first data set further includes one or more second analog inputs in the second subarea, wherein the one or more second analog inputs remain within the second subarea.

20. The method as recited in claim 15 wherein the first data set further comprises one or more first clock trees to distribute clocks within the first subarea and one or more second clock trees to distribute clocks within the second subarea, and wherein the one or more first clock trees are electrically isolated from the one or more second clock trees in the full instance.

* * * * *